US012151777B2

(12) United States Patent
Dragoni

(10) Patent No.: US 12,151,777 B2
(45) Date of Patent: Nov. 26, 2024

(54) BICYCLE WITH REAR SUSPENSION AND RELATIVE SYSTEM OF TRANSMISSIONS

(71) Applicant: Ochain S.R.L., Varese (IT)

(72) Inventor: Fabrizio Dragoni, Varese (IT)

(73) Assignee: OCHAIN S.R.L., Varese (IT)

( * ) Notice: Subject to any disclaimer, the term of this patent is extended or adjusted under 35 U.S.C. 154(b) by 664 days.

(21) Appl. No.: 17/601,588

(22) PCT Filed: Mar. 24, 2020

(86) PCT No.: PCT/IB2020/052734
§ 371 (c)(1),
(2) Date: Oct. 5, 2021

(87) PCT Pub. No.: WO2020/194177
PCT Pub. Date: Oct. 1, 2020

(65) Prior Publication Data
US 2022/0169333 A1  Jun. 2, 2022

(30) Foreign Application Priority Data

Mar. 25, 2019  (IT) ........................ 102019000004259

(51) Int. Cl.
*B62M 1/36* (2013.01)
*B62K 25/02* (2006.01)
(Continued)

(52) U.S. Cl.
CPC ............... *B62M 1/36* (2013.01); *B62K 25/02* (2013.01); *B62M 1/105* (2013.01); *B62M 9/16* (2013.01); *F16D 3/12* (2013.01)

(58) Field of Classification Search
CPC .......... B62M 1/105; B62M 9/16; B62K 25/28
See application file for complete search history.

(56) References Cited

U.S. PATENT DOCUMENTS 11,913,534 B2* 2/2024 Miller ....................... G01L 3/24
2021/0221466 A1* 7/2021 Chan ....................... B62M 1/105

FOREIGN PATENT DOCUMENTS

ES       267470 A1   5/2018
JP    2004168238 A   6/2004

OTHER PUBLICATIONS

International Search Report and written opinion issued in the International Patent Application PCT/IB2020/052734, by the European Patent Office mailed Jun. 16, 2020, 8 pages.

* cited by examiner

*Primary Examiner* — Kevin Hurley
*Assistant Examiner* — Hosam Shabara
(74) *Attorney, Agent, or Firm* — Schott, P.C.

(57) ABSTRACT

A bicycle includes a frame, a rear wheel, a suspension system that allows a predetermined relative movement therebetween, and a drivetrain system. The drivetrain system includes a crankset fixed to the frame, a hub and pinion assembly fixed to the rear wheel rotatable about a common pivot axis thereof, and a drive chain placed to connect them directly to each other. The crankset and the hub and pinion assembly are subjected to mutual movement by the action of the suspension system, where at least one among the crankset and the hub and pinion assembly includes a free stroke device that allows both an outbound and inbound free angular stroke of the chain with respect to the respective pivot axes of the crankset and/or of the hub and pinion assembly. The angular stroke is limited by a predetermined angle of entity related to the movement between the wheel and frame.

20 Claims, 8 Drawing Sheets

(51) Int. Cl.
*B62M 1/10* (2010.01)
*B62M 9/16* (2006.01)
*F16D 3/12* (2006.01)

BICYCLE WITH REAR SUSPENSION AND RELATIVE SYSTEM OF TRANSMISSIONS

The present invention relates to a bicycle with rear suspension and relative drivetrain system. The invention is particularly adapted to mountain bikes, however applications to other bicycles with other intended uses or other fields are not excluded.

BACKGROUND ART

"Full suspended" mountain bikes, i.e. provided with rear suspension, are known in the field of bicycles.

The rear suspension generates a travel of the wheel with respect to the frame with undesired effects on the drivetrain, in particular a pull of the chain in compression step, as though received from a jump or the impact with a bump. This generates a violent rotation of the pedals opposite to the advancement rotation, which destabilizes the driver, up to losing contact with his/her feet. From a mechanical viewpoint, the chain is highly stressed and could end up breaking. The greater the movement of the wheel with respect to the frame, the greater the effect is felt and is damaging.

It is worth noting that there are travel standards according to the category of use of the bicycle. The travel of the modern MTB (mountain bike) frames goes from a minimum of 80 mm (XC race) to a maximum of 240 mm (downhill race). All the other categories are in the middle.

The problem is particularly felt in the "downhill" categories, i.e. those with travel of the rear suspension from 130/140 mm and up. This does not mean that the problem is not felt also in the other categories. Certainly, the travel indicated may be considered a maximum limit that cannot be overcome with the current technology.

An attempt to overcome the problem is known from Spanish Patent ES2670470. It describes a crankset where the gear wheel is rotatable to a certain extent with respect to the cranks and such movement is dampened in the forward stroke by springs. However, such system poses problems for resuming the pedalling because it makes the torque applied to the pedals ineffective. Furthermore, strong counter-blows persist in the Spanish system due to poor progressivity both in the forward stroke and in the backward stroke, which make the effectiveness thereof minimal. The Spanish system also suffers from strong stresses and vibrations of the chain that often are not able to be absorbed by the movable arm of the rear shifter.

A further prior patent is Japanese Patent JP2004168238. It however does not deal with the subject but only incidentally describes a crankset where elastic gaskets are interposed between gear ring and crank arm. They however are completely unsuitable for providing a damping for absorbing the stresses of the jumps because although the gear ring and the crank arm are movable between each other, the possible elastic action of such gaskets would occur in a random and limited point of the relative movement thereof, whereby it would not in any way be effective.

The general object of the present invention is to overcome all or some of the drawbacks of the prior art.

A preferred object of the present invention is to provide a system for reducing or eliminating the counter-blow that is particularly adapted to bicycles, with increased travel of the rear wheel and applicable also to all types of bicycle with rear travel.

A further preferable object is that of allowing the current limits of rear travel to be increased.

Another preferred object of the present invention is that of providing a solution to known problems applicable to pre-existing bicycles and compatible with the standards of the current bicycles.

Another preferred object of the present invention is that of providing a solution to the known problems that is easy and affordable to produce.

GENERAL INTRODUCTION

According to a first general aspect, the present invention relates to a bicycle comprising a frame, a rear wheel, a suspension system of the rear wheel with respect to the frame that allows a predetermined relative displacement (H1) between them, a drivetrain system for transmitting the motion from a crankset to the rear wheel, where the drivetrain system comprises a crankset fixed to the frame, a hub and pinion assembly fixed to the rear wheel that is rotatable about a common pivot axis thereof, and a drive chain placed to connect them directly to each other, where the crankset and the hub and pinion assembly are subjected to reciprocal displacement (H1) by the action of the suspension system, where at least one among the crankset and the hub and pinion assembly comprises a free stroke device placed to allow both an forward and backward free angular stroke (A1) of the chain with respect to the respective pivot axes (X, x1) of the crankset and/or of the hub and pinion assembly, where the angular stroke is limited by a predetermined angle (A1) of entity related to said relative movement (H1) between wheel and frame, characterized in that:

said forward stroke (A1) is the one that occurs both in the passage from an extended position to a compressed position of the suspension, and at the start of the pedalling in extended position of the suspension, said free stroke device comprises first damper means that act for the entire forward angular stroke (A1), opposing it, and said free stroke device comprises additional damper means that act only in a final stretch of forward angular stroke (A2), opposing it.

Advantageously, such combination increases the stability and safety of the bicycle during the stresses and allows the pedalling to be resume more easily.

In this manner, it is possible to effectively compensate for the pedal kickback without diminishing the pedalling.

Said above ratio may provide for example, an angular stroke that is greater than or equal to the one corresponding to the maximum movement of the suspension.

The forward stroke is the one that occurs both in the passage from an extended position to a compressed position of the suspension following receipt from a jump or due to impact against a bump, and at the starting of the pedalling in extended position of the suspension.

The passage between the extended position and compressed position is intended during the use of the bicycle, and therefore extended position means the static position of the suspension during the pedalling on a flat surface (therefore without bumps and without jumps), commonly called SAG quota.

Preferably, said free stroke device comprises further additional damper means that act only in a final stretch of backward angular stroke (A2), opposing it.

It in general is preferable for the additional damper means that act only in a final stretch of forward angular stroke to provide a resistance to the increased rotation of the first damper means, in such a manner there is an accentuated progressivity of resistance prior to stopping.

According to another general feature, it is preferable for the additional damper means that act only on a final stretch of the forward angular stroke to provide a resistance to the increased rotation of the additional damper means that act only in a final stretch of backward angular stroke.

Preferably, the crankset comprises at least one pair of cranks, a drive shaft placed to connect the cranks to each other and extending about a common pivot axis thereof, at least one gear wheel placed to rotate about said axis and intended to engage the chain; where said free stroke device is operatively interposed between the gear wheel and the cranks to allow said free stroke with respect to the cranks.

Preferably, said hub and pinion assembly comprises at least one free body and at least one gear wheel, where the free stroke device is placed to allow said free stroke therebetween.

According to certain preferred embodiments, the additional damper means comprise at least one elastic element placed at stroke end, for example made of non-expanded polyurethane.

For example, said elastic element is interposed between two abutment elements moving close to and away from each other due to the effect of such stroke, where the elastic element is compressed between the two abutment elements at stroke end.

It is preferable in general for the at least one elastic element to comprise at least one element made of elastomeric material compressed in said final stretch of stroke, and for the first damper means to comprise at least one helical spring compressed along said entire angular stroke.

According to preferred embodiments of the invention, the at least one elastic element comprises at least one element made of elastomeric material compressed in said final stretch of stroke, wherein the elastomeric element is interposed between two elements that are rotatable with respect to each other, one of the two elements comprises a seat for said elastomeric element, the elastomeric element being integral in rotation with said seat, and the seat keeps the elastomeric element in a contactless position with the other rotatable element before the stretch in which it is compressed.

According to certain preferred embodiments of the invention, the additional damper means comprise hydraulic damper means comprising at least one pair of hydraulic chambers that communicate by means of a communication opening placed at a stroke end abutment, at least one of the two chambers has arc extension with angular extension corresponding at least to said free stroke (A1), and at least one movable abutment element in said chamber to retract against the stroke end abutment, the chamber contains hydraulic fluid and reducer means of the communication opening as the movable element nears the stroke end abutment.

In this case, said reducer means preferably move in rotation integrally with said movable abutment element.

Said hydraulic chambers preferably comprise a radially outer wall and a radially inner wall that are movable in rotation with respect to each other, where the passage between the chambers comprises a close zone between said two walls and where the reducer means comprise a ramp in at least one of said two walls that can be inserted and extracted into/from said close zone.

Said movable abutment element preferably is integral with one of the two walls and the other defines the stroke end abutment.

According to a second general aspect thereof, the invention relates to a drivetrain system of the bicycle of the type indicated above.

According to a third general aspect thereof, the invention relates to a crankset of the above-indicated drivetrain system.

According to a fourth general aspect thereof, the invention relates to an assembly of pinions comprising a plurality of pinions and a free stroke device coupled thereto and of the type indicated above, where the unit comprises a coupling and uncoupling or integration interface with a hub assembly of a bicycle, preferably with the free body.

According to a fifth aspect, the invention relates to a free stroke device of the type indicated above.

The free stroke device preferably comprises a first and a second main body, where they:
 are rotatably coupled to each other;
 each comprise at least one pair of abutments operatively facing the pair of abutments of the other body, one of the two bodies having an angular distance between the abutment pair that is greater than the other body so that the interaction of said pairs defines two stroke ends of said forward and backward free angular stroke (A1),
 the additional damper means are operatively active with respect to said abutment pairs to dampen the abutment of at least one of the two stroke ends (A2).

Said damper means preferably comprise at least one viscous dissipator.

According to certain preferred embodiments, the main bodies comprise the further damper means interposed with one another, which are active for the entire extension of the free stroke, preferably they are elastic and more preferably, they comprise at least one helical spring compressed between the two bodies by the relative movement thereby with the interposition of at least one sphere.

Below we list certain aspects of the invention which in addition to being associated with the others indicated above, may be considered independent.

According to a first independent aspect, the invention relates to a free stroke device comprising two bicycle elements having a free angular stroke (A1), both forward and backward stroke with respect to each other, where said angular stroke is limited to a predetermined angle (A1), said free stroke device having damper means that are active for the entire forward angular stroke, where the damping action is greater at a stretch of forward stroke end.

In this case, the damper means preferably are also active for the entire backward angular stroke and the action is also greater at a stretch of backward stroke end.

Preferably, the greater action in the stretch of stroke end is obtained at least by means of hydraulic damper means with a greater action of said stretch and/or by means of a sum of hydraulic and elastic damper means.

The damper means preferably are also active for the entire backward angular stroke and the action is greater in the forward stroke.

In this case, it preferably is obtained in the forward stroke at least by elastic damper means and by hydraulic damper means which combine the action thereof, while only the hydraulic damper means are active in the backward stroke.

According to a second independent aspect thereof, the invention relates to a free stroke device comprising two bicycle elements having a free angular stroke (A1), both forward and backward stroke with respect to each other, where said angular stroke is limited to a predetermined angle (A1), said free stroke device having damper means that are active both for the entire forward and backward angular stroke, where preferably the action is greater in the forward stroke, where for example, the effects of elastic and hydraulic damper means are combined.

DETAILED DESCRIPTION

Further features and advantages of the present invention will be more evident from the following detailed description of preferred embodiments thereof made with reference to the appended drawings and given by way of a non-limiting indicative example. In such drawings:

FIG. 1 schematically shows a bicycle according to the present invention;

Figure 4:
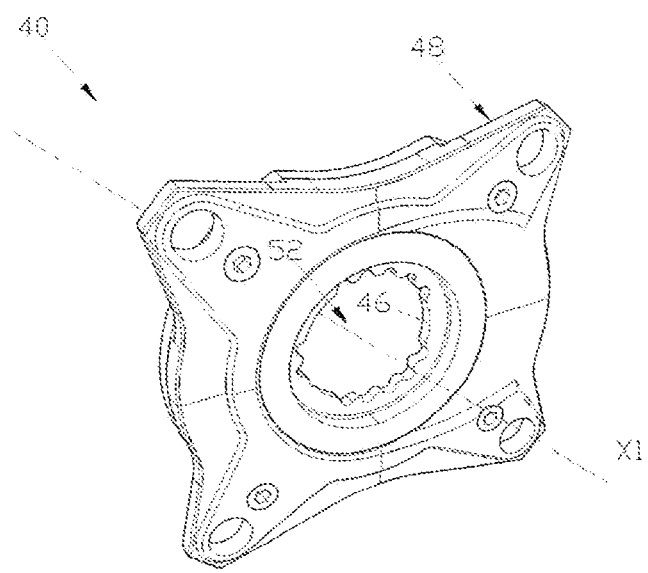
FIG. 4 shows the free stroke device of the crankset of FIG. 3.
Figure 5:
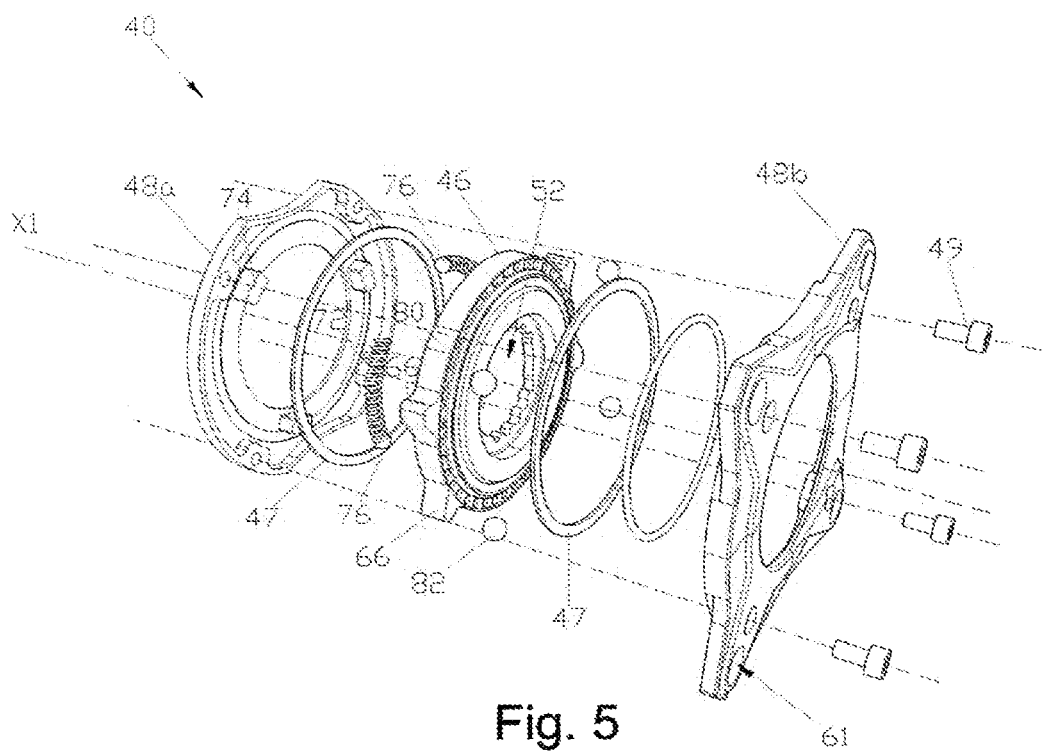
Figure 6:
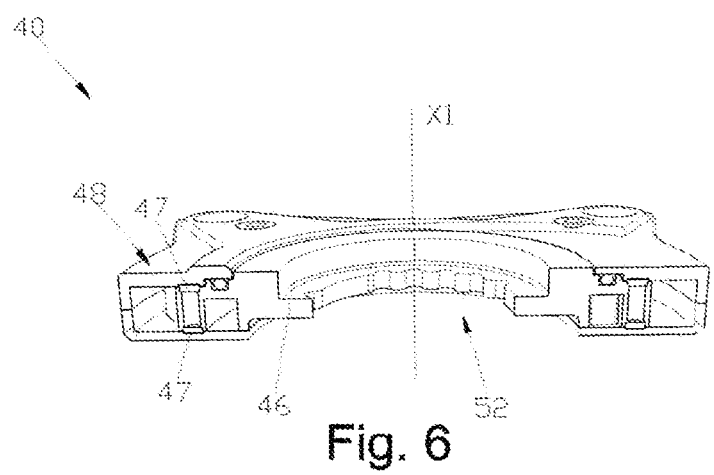
Figure 7:
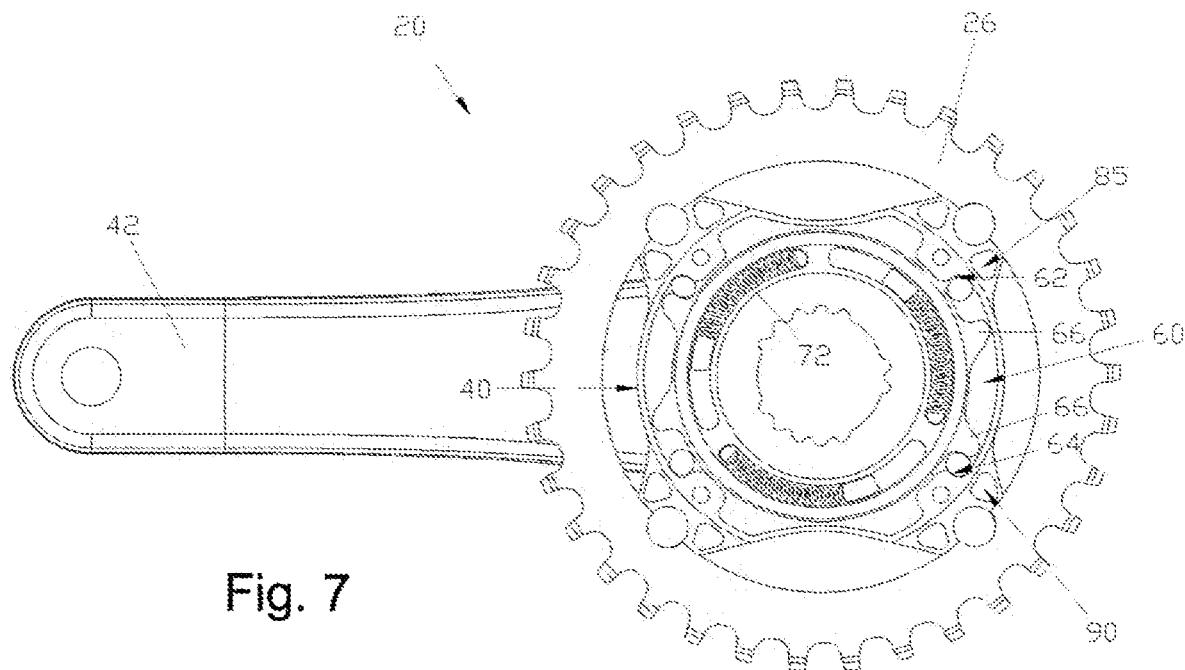
Figure 8:
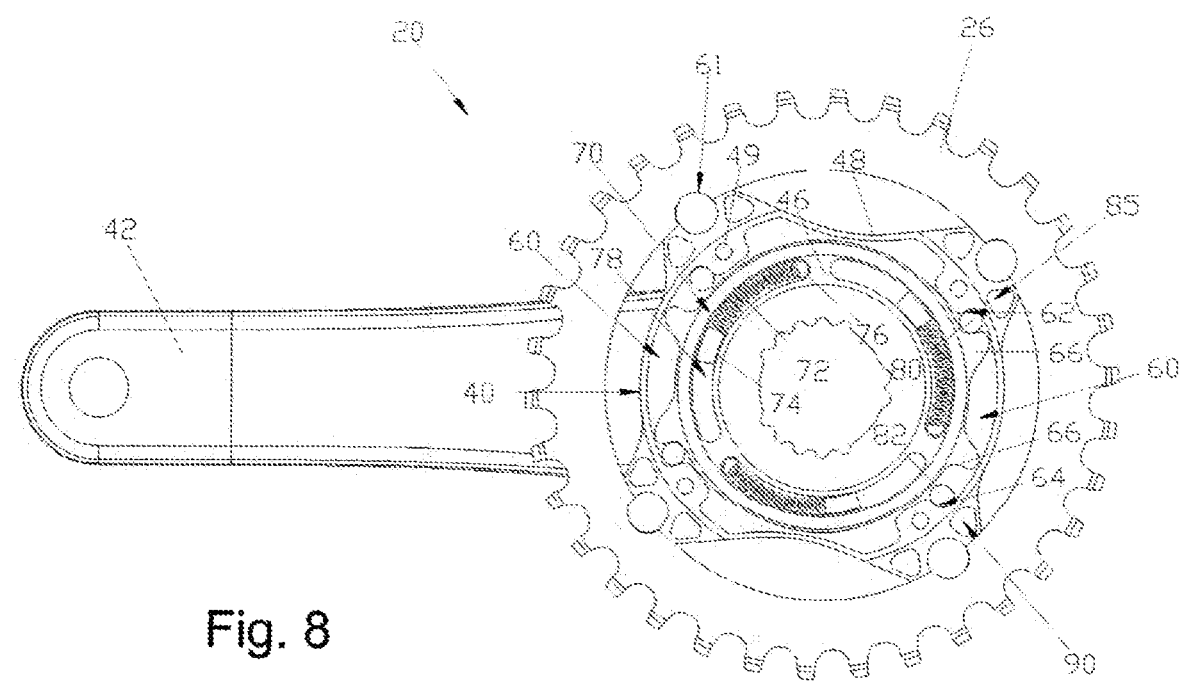
Figure 9:
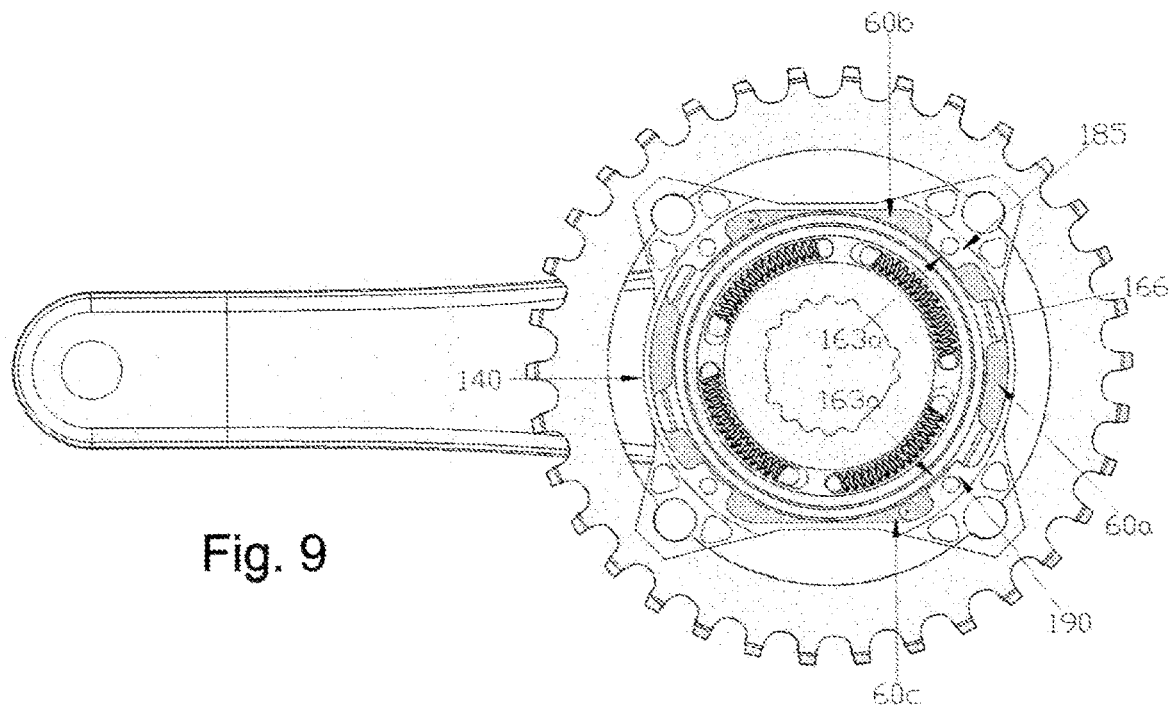
Figure 10:
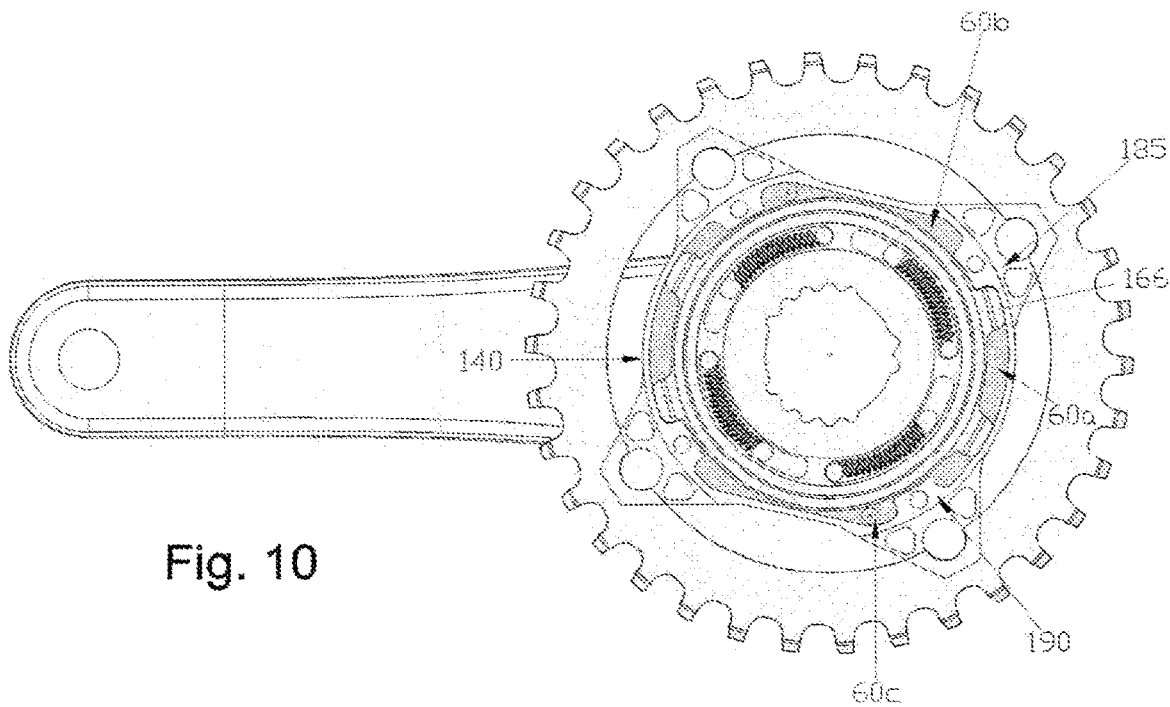
Figure 11:
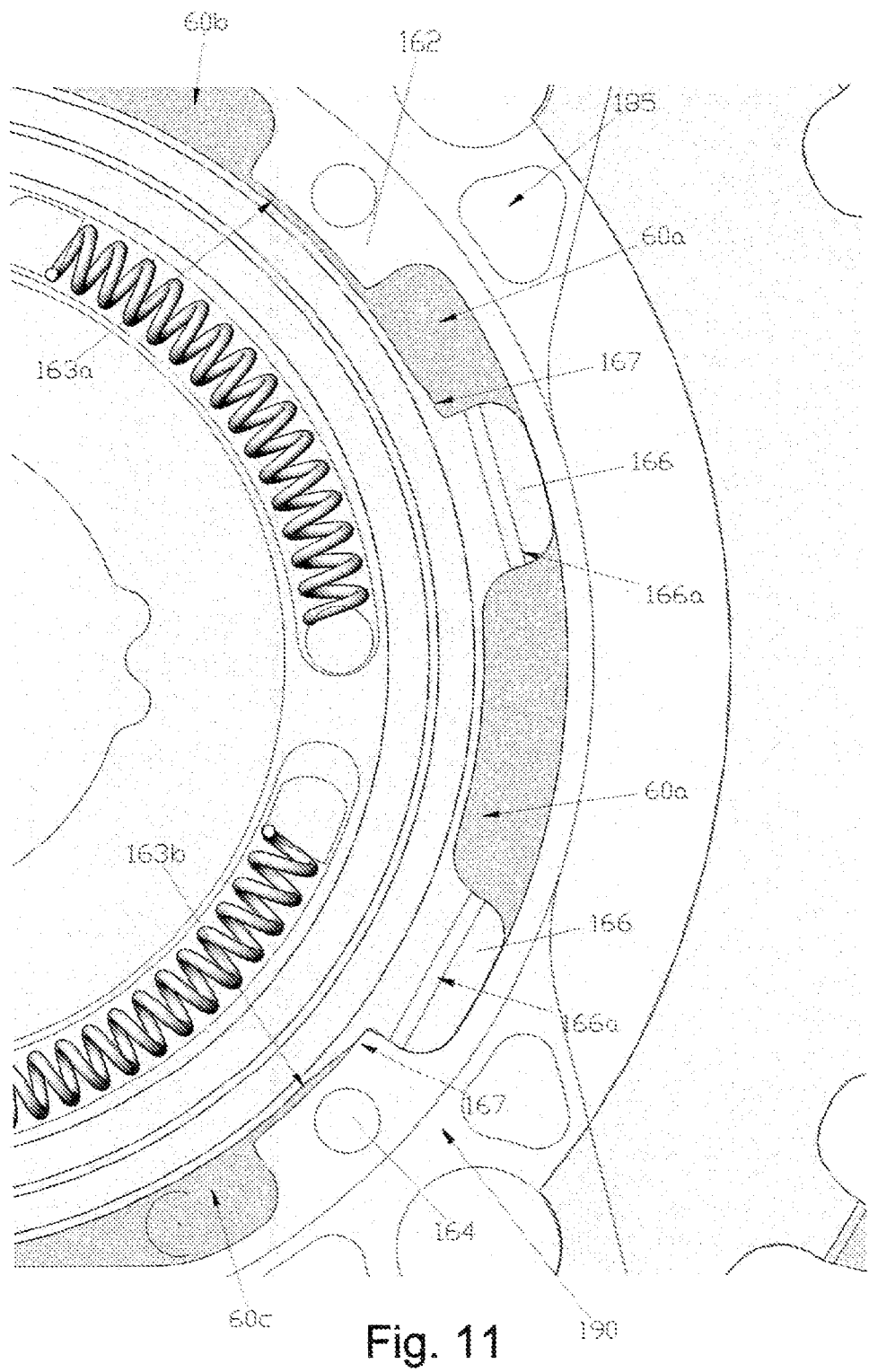
Figure 12:
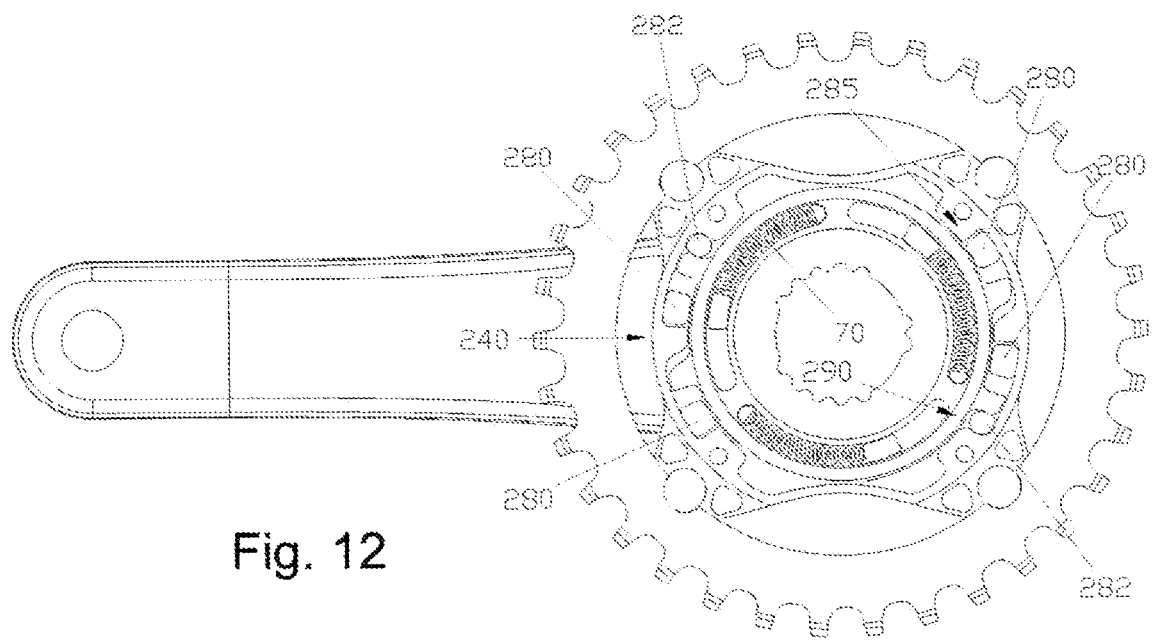
Figure 13:
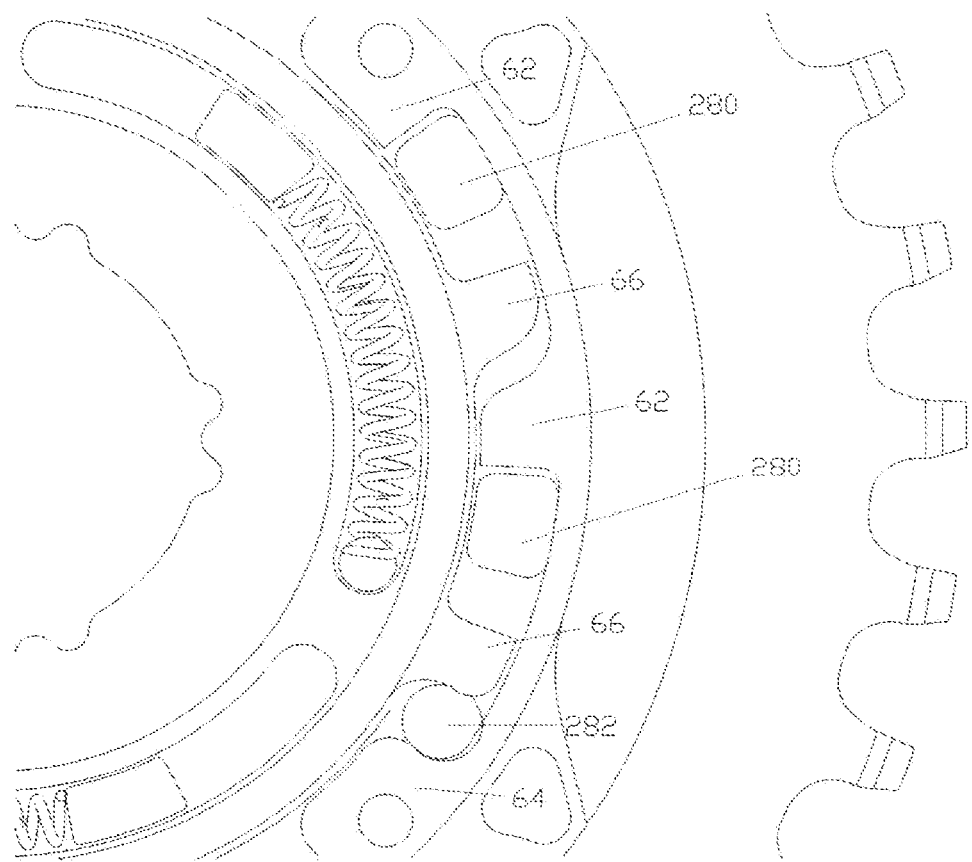
Figure 14:
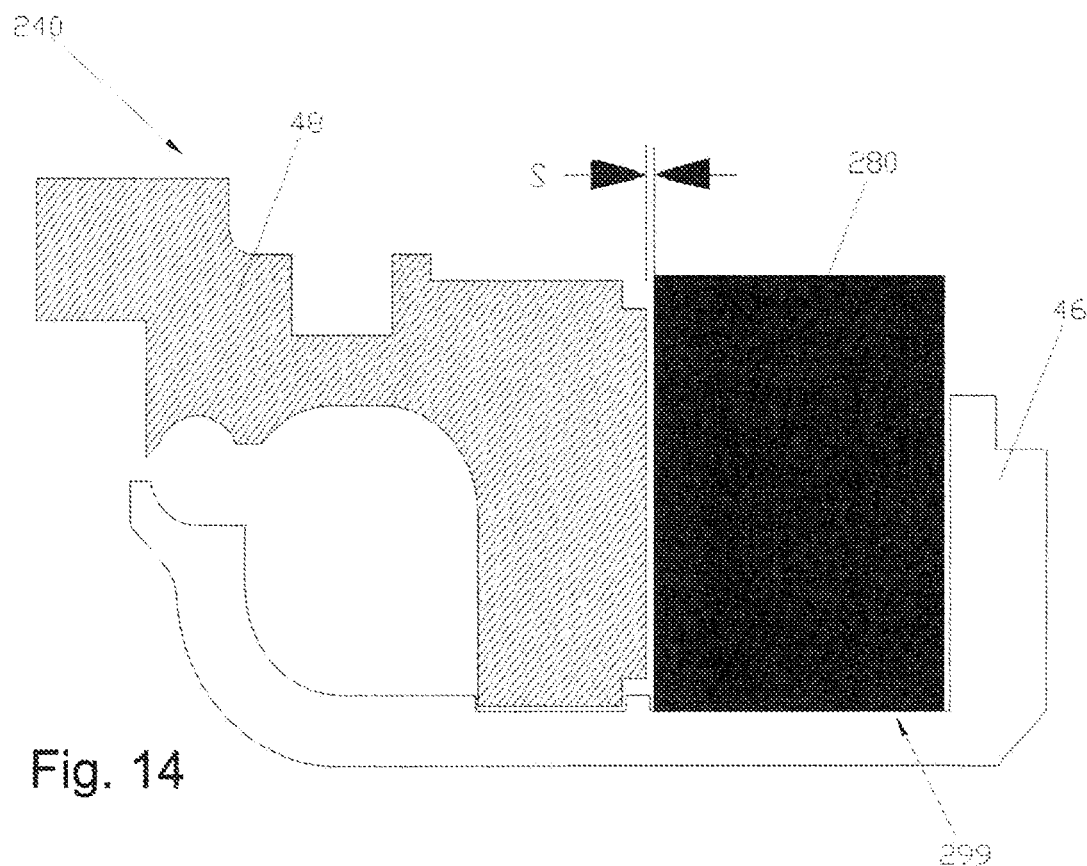
Figure 15:
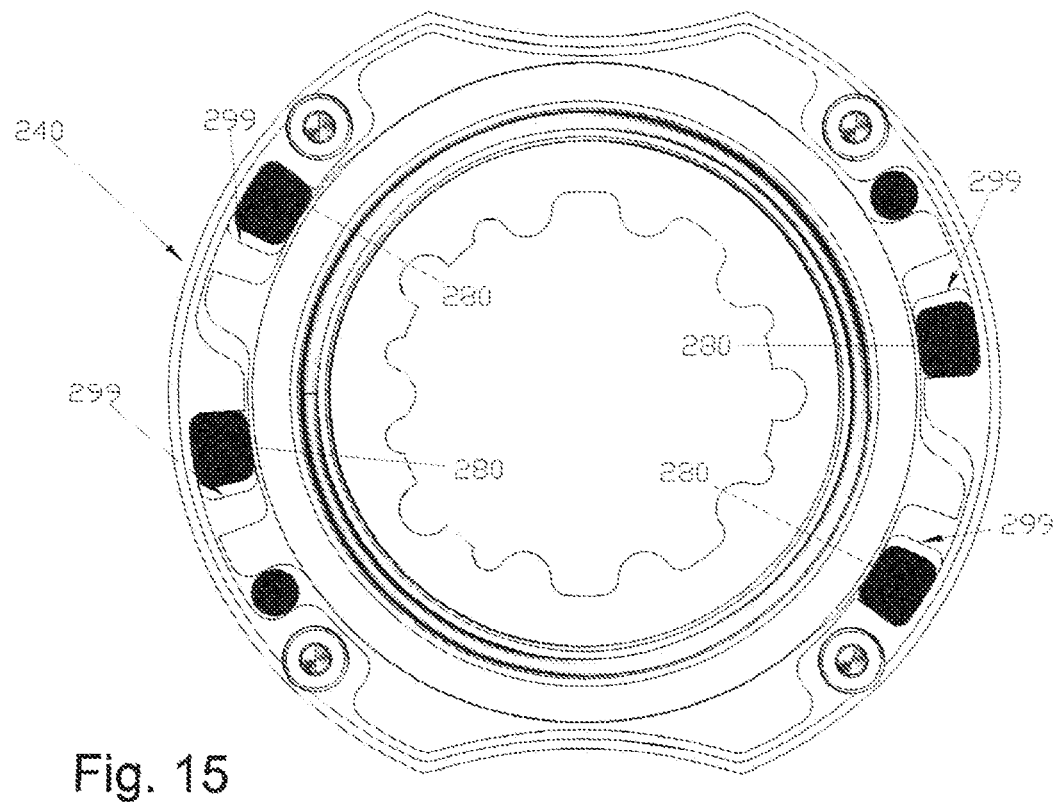

FIGS. 5 and 6 respectively show an exploded view and a section view of the device of FIG. 4;

FIGS. 7 and 8 show positions of respective stroke ends of the free stroke device of the preceding figures;

FIGS. 9 and 10 show a free stroke device according to an alternative embodiment of the invention, in respective stroke end positions;

FIG. 11 shows a detail, on enlarged scale, of FIG. 9;

FIG. 12 shows a free stroke device according to a further alternative embodiment of the invention;

FIG. 13 shows an enlargement of FIG. 13;

FIG. 14 shows a section of the device of FIG. 12 at additional damper means which are active only in the final stretch of forward stroke;

FIG. 15 shows the free stroke device of FIG. 12 seen from the opposite side with respect to FIG. 12.

Figure 1:
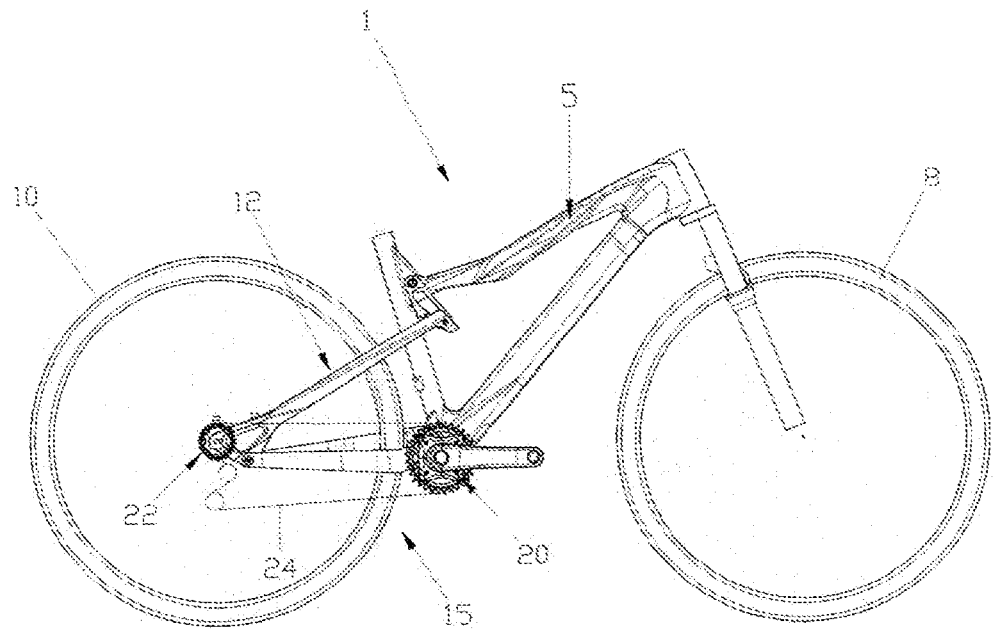
Figure 2:
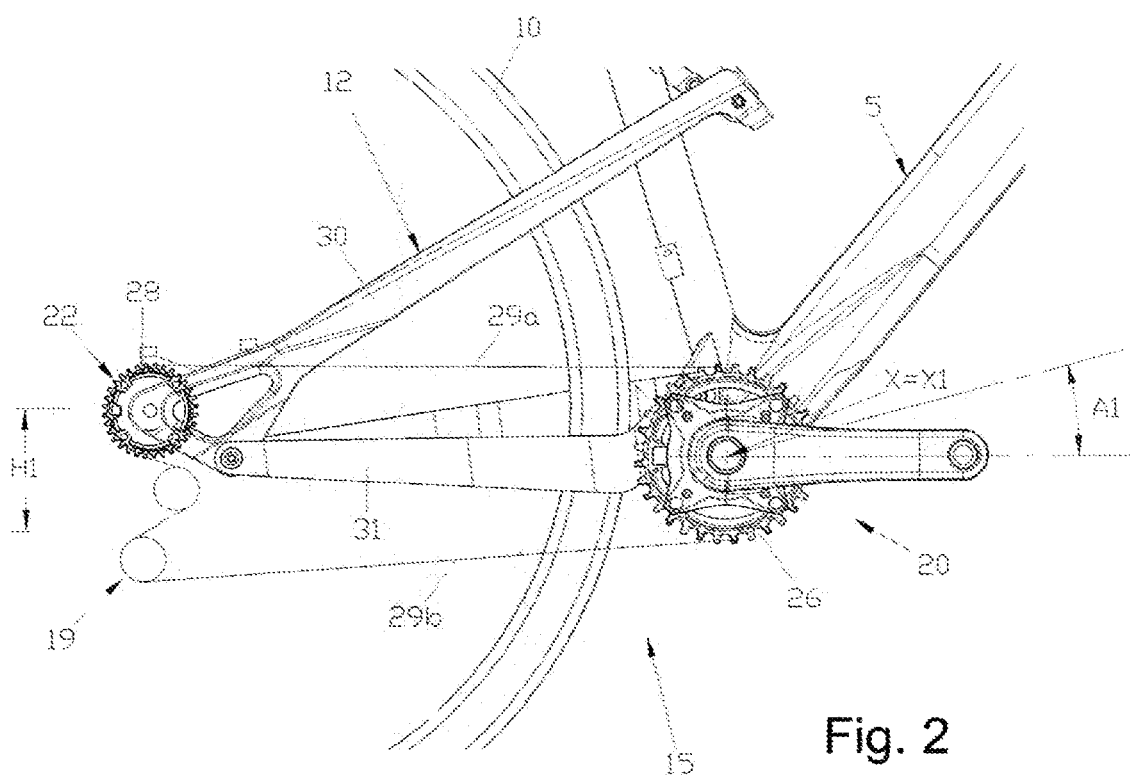
FIG. 2 shows the detail of the drivetrain system of FIG. 1.

FIG. 1 shows a bicycle according to the present invention, indicated as a whole with reference number 1.

Bicycle 1 comprises a frame 5, a front wheel 8, a rear wheel 10, a suspension system 12 of the rear wheel 10, a drivetrain system 15 for putting the rear wheel 10 into rotation by means of a crankset 20 fixed to the frame 5.

The suspension system 12 may be of any applicable type, for example comprise suspension arms 30, 31 which are articulated to one another and to the frame to allow a predetermined oscillation of the wheel 10, and comprise oscillation damper means (not shown).

In addition to the crankset 20, the drivetrain system 15 also comprises a rear hub and pinion assembly fixed to the wheel 10 and a drive chain 24 which transmits the motion between the two.

During use, the oscillation H1 of the rear wheel 10 results in the oscillation of the hub assembly 22 with respect to the crankset 20 and accordingly, a pull of the chain 24.

The crankset 20 and the rear hub and pinion assembly 22 in particular each comprise at least one gear wheel 26 and 28, and the chain 24 forms a ring with which it engages them, both having two stretches 29a and 29b suspended between said wheels. When the rear wheel 10 oscillates upwards due to a bump or a jump, the chain is subjected to a pull. The phenomenon is known with the name "pedal kickback".

In general, the upper stretch of chain 29a is subjected to the pull, while the lower stretch 29b is slack. This may occur for example, because it in general is preferable for the drivetrain system to comprise a gear 19 with a knuckle arm, for example of the traditional type comprising a rocker lever and cage, oscillating due to elastic suspension which compensates for the pull stresses on the lower stretch 29b of the chain.

Below, we describe a compensation system of the chain pull by means of a free stroke device 40 applied to the crankset 20. That described in reference to the application of the free stroke device to the crankset is applicable in a mirror-like manner to the application of the rear wheel to the hub and/or pinions.

Figure 3:
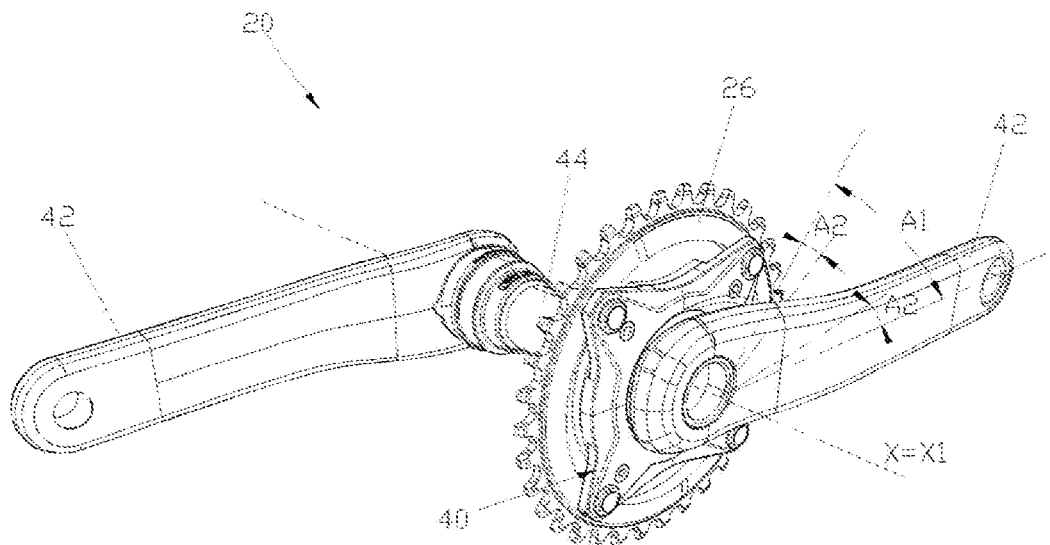
FIG. 3 shows the crankset of the drivetrain system of FIG. 2.

With reference to FIG. 3, crankset 20 comprises a pair of cranks 42 coupled to a drive shaft 44 that is rotatable about an axis X, to drag the gear wheel 26 into rotation.

The free stroke device 40 is interposed between the cranks and the gear wheel 26.

The device allows a relative rotation A1 of predetermined entity between the cranks and the gear wheel. The entity of A1 depends on the maximum oscillation H1 of the suspension system because it must be capable of avoiding the chain pull. Therefore, A1 compensates for H1.

The relative rotation A1 is also called free angular stroke and is carried out both forward and backward between two ends called "stroke end". The rotation A1 is a rotation with two damping levels, in particular there is a first damping level during the entire forward stroke A1, and an additional damping level only in a final stretch of angular stroke A2 at one or both the stroke ends, i.e. only at the forward stroke end or also at the backward stroke end.

With reference to FIGS. 4, 5 and 6, the free stroke device 40 comprises a first and a second main body 46, 48 which are coupled rotatable with respect to each other about an axis X1.

The first main body 46 comprises an opening 52 with a shape that is complementary to a shaped profile for transmitting torque of the shaft 44 (not shown) and such whereby the pivot axes X and X1 of the shaft and of the free stroke device 40 coincide under assembled condition on the crankset 20.

The second main body 48 is a shell comprising a plurality of anchor points 61 to the gear ring 26. The shell 48 preferably is divided into two half-shells 48a and 48b that can be coupled to and uncoupled from each other. The first main body 46 is housed in the second main body 48 in rotatable manner with respect thereto, about axis X of the shaft 44. The first body 46 is retained in the second body 48 when the two half-shells 48a and 48b are tightened to each other, for example by means of screws 49.

The relative sliding between the first and second body may be facilitated by implementing for example, one or more bearings 47, for example sliding bearings, such as for example sleeve bearings.

With reference to FIGS. 7 and 8, the free stroke device 40 is shown mounted in the crankset 20 with the half-shell 48a removed for descriptive clarity. The crankset is of the type intended to be mounted on the right-hand side of the bicycle, as seen by an observer straddling the bicycle and with reference to the advancement direction.

The device 40 comprises limitation means of the free stroke A1 comprising at least one limitation chamber 60 extending in an arc of circle about axis X1 defined by the walls of the first and of the second main body 46 and 48. Said chamber comprises a first and a second end 62 and 64 in circumferential direction, which are integral with one of the two main bodies 46 and 48 that serve as stop abutment for at least one movable abutment element in said chamber integrally integral with the other main body 46, 48.

In the example illustrated, there are two movable abutment elements 66 in the chamber 60 that are placed at predetermined distance from each other that is less than the distance between the ends 62 and 64 of the chamber.

The ends 62 and 64 in this manner serve as forward and backward free stroke end, respectively.

FIG. 7 shows the free stroke device 40 under a resting condition corresponding to the absence of the chain pull, i.e. when the suspension system is extended and the rear wheel is at the maximum length thereof of the travel H1.

In the resting position, the movable abutment element 66 is stopped against the end of the backward stroke end 64.

FIG. 8 shows the free stroke device 40 in a condition of maximum stroke corresponding to the presence of the maximum chain pull tolerable, corresponding to the suspension system totally compressed, and therefore to the rear wheel 10 in the position thereof of minimum length of the travel H1.

In the position of maximum stroke, the respective movable abutment element 66 is stopped against the end of the forward stroke end 62.

Preferably, the free stroke device 40 comprises a plurality of limiting chambers 60 and relative movable abutment elements.

The free stroke device 40 comprises first damper means 70 of the free angular stroke A1 that are operatively interposed between the first and the second main body 46 and 48.

Such means 70 comprise at least elastic means 72 operatively interposed between the first and the second main body 46 and 48, placed to rest in the resting position and compressed by the forward stroke. In this manner, the damping action thereof is activated along the entire forward stroke A1 and therefore it is the first damping level described above.

The elastic means for example, comprise at least one helical spring 72 placed as arc of circle in a first damper chamber 78, extending as arc of circle about the axis X1 and defined by the walls of the first and of the second main body 46 and 48. A reference element 74 integral with one of the two main bodies slides in the chamber 72, which reference element compresses the spring 72 in circumferential direction against a sphere 76.

Preferably, there are a plurality of first damper chambers 70 with relative helical springs 72, as above. Said chambers preferably are placed in sequence between one another along a same circumference.

The free stroke device 40 comprises second damper means 85 for creating an additional damping level, which is only active in a predetermined angular stretch A2 of forward stroke end.

The second damper means 85 comprise for example, second elastic means 80 interposed between a movable abutment element 66 and the respective end of forward stroke end 62.

In addition or alternatively, the free stroke device 40 comprises third damper means 90 for creating an additional damping level, which is only active in a predetermined angular stretch A2 of backward stroke end.

The third damper means 90 comprise for example, third elastic means 82 interposed between a movable abutment element 66 and the respective end of backward stroke end 64.

The elastic elements 80 and 82 may for example, comprise elastomeric elements, for example elastic spheres.

When used to descend and/or in a jump, the driver rests on the pedals with the cranks 42 arranged horizontally (position of maximum stability). In such position, the free stroke device is in the resting condition of FIG. 7 due to the effect of the thrust of the springs 72. When the rear wheel is raised due to the effect of a knock, it drags the gear wheel 26 into rotation for the stretch of free stroke, placing the free stroke device 40 in the condition of maximum stroke of FIG. 8 or in an intermediate condition, according to the thrust undergone. Such stroke is considered the forward stroke.

The third damper means 90 eliminate the operating noisiness during the backward step, while the second damper means 85 cushion the knock in the forward step. It therefore is preferable for both of them to be present.

It is worth noting that when the driver resumes pedalling from the resting position of FIG. 7, the free stroke device undergoes the same rotation of forward stroke up to the position of maximum stroke of FIG. 8. The second damper means 85 allow resuming the pedalling with more comfort and progressivity.

The invention advantageously generates three phenomena:

1) It completely eliminates the effect called pedal kickback.

2) A longitudinal clockwise rotation of the bicycle of predetermined entity is not perceived by the driver at the level of vertical displacement of the pedal in advanced position (the pedal which receives the greatest load during the driving). In other words, the longitudinal rotation of the bicycle is isolated with respect to the position of the pedals.

3) A vertical translation of the bicycle of predetermined entity is not perceived by the driver at the level of vertical displacement of the pedal in advanced position (the pedal which receives the greatest load during the driving). In other words, the vertical translation of the bicycle is isolated with respect to the position of the pedals.

The sum of the three phenomena described above results in a "standardization" of the driving of the bicycle; in other words, certain stresses directed at the driver by means of the pedals are "dampened" and/or cancelled. Moreover, the suspension is completely released from the position of the pedals and from the pull of the chain and this allows them to operate without interference.

Alternative embodiments of the invention are described below where same or similar elements to the preceding ones are indicated with the same reference number or increased by 100 or multiples thereof.

With reference to FIGS. 9, 10 and 11, they show an alternative free wheel device indicated by number 140, which differs from the preceding one in that the second and third damper means 185 and 190 are hydraulic rather than elastic.

Moreover, such additional damper means are generally integrated in hydraulic damper means that are active for the entire forward stroke, where the action thereof is combined with the one of the springs 70, and that are also active for the entire backward stroke.

The second damper means 185 comprise a pair of mutually-communicating hydraulic chambers 60a and 60b full of hydraulic fluid, of which one contains the at least one movable abutment element 166.

The chambers 60a and 60b are separated by an element 162 that defines the end of forward stroke end abutment against which the movable abutment element 166 stops.

The chambers 60a and 60b communicate with each other through an opening 163a at the stroke end abutment element 162. Such opening preferably is a gap having circumferential extension between the main bodies 46 and 48.

The main body 46 comprises a ramp 167 close to the movable abutment element 166 capable of being inserted into the gap 163a by rotation about the axis X1 and of narrowing it. It is also possible to provide for the ramp to narrow the gap up to obstructing it at the end of the stroke.

In the forward stroke, the movable abutment element 166 pushes the fluid from the chamber 60a to the chamber 60b. The profile of the bodies 46 and 48 is such whereby the gap 163a remains constant up to reaching the ramp 167 close to the end of the stroke. At that point, the ramp narrows the gap and makes the passage of fluid more difficult, creating the additional damping in the stretch A2 of forward stroke end.

The same occurs in a mirror-like manner in the backward stroke at the end of stroke end 164, where an equal or similar gap 163b serves as connection between the chamber 60a and a third hydraulic chamber 60c.

It is worth noting that the movable abutment element 166, or as in the case illustrated, the two elements 166, divide the stroke limitation chamber 60a into a plurality of sub-chambers with variable volume and necessarily full of hydraulic fluid. The latter flows from one sub-chamber to another through bypass openings 166a in the movable abutment elements 166 or therebetween and the walls of the chamber. The openings in the elements 166 may be for example, calibrated holes or openings for screwing calibrated nozzles.

FIG. 9 shows the resting position and FIG. 10 shows the forward stroke end position for compensating the chain pull.

In general, the hydraulic embodiment is preferable because the hydraulic means serve as viscous dissipators and provide a given damping along the entire forward and backward stroke A1, although it is accentuated towards the stroke ends A2, and therefore the operation is more uniform, especially when the pedalling is resumed.

Applications in general are not excluded wherein the free stroke device is oversized with respect to the chain pull reachable with the maximum reachable travel of the suspension, for example there may be a suspension that generates a maximum angular stroke of 6° and a free angular stroke device that has a maximum stroke of 10°.

With reference to figures from 12 to 15, they illustrate an alternative free wheel device indicated by number 240, which differs from the one in figures from 5 to 8 in that the additional forward damper means 285 comprise at least one elastic element 280 that is substantially square rather than spherical.

This in general represents a condition wherein, the housing seat of the forward stroke end elastic element being equal, the latter has a greater volume that fills the space of the chamber in which it is housed prior to being compressed, thereby the compression deformation thereof is less than the case represented by the sphere. Such difference may be present also between the forward stroke end elastic element 280 and the backward stroke end element 282 of the additional backward damper means 290.

Naturally, the shapes of elastic element and of housing chamber may vary from that illustrated, the general concept of filling the volume prior to the deforming remaining.

Another general aspect represented by this embodiment, also possibly independent of the preceding one, is given by the fact that the forward stroke end elastic element (and/or the backward stroke end one) is partially recessed in a housing seat 299 obtained in one of the two main bodies 46, 48, preferably in body 48. This arrangement is functional to keeping the elastic element detached from the other main body during the rotation stroke at least as long as such elastic element is not deformed by compression. Such detachment is represented by the distance S in FIG. 14.

A further general aspect represented by this embodiment, also possibly independent of the preceding ones, is given by the fact that the number of elastic elements 280 that are only active in the final stretch of forward stroke is greater than the number of elastic elements 290 that are active only in the stretch of backward stroke end.

General Interpretation of Terms

In understanding the object of the present invention, the term "comprising" and its derivatives, as used herein, are intended as open-ended terms that specify the presence of declared characteristics, elements, components, groups, integers and/or steps, but do not exclude the presence of other undeclared characteristics, elements, components, groups, integers and/or steps. The above also applies to words that have similar meanings such as the terms "comprised", "have" and their derivatives. Furthermore, the terms "part", "section", "portion", "member" or "element" when used in the singular can have the double meaning of a single part or a plurality of parts. As used herein to describe the above executive embodiment(s), the following directional terms "forward", "backward", "above", "under", "vertical", "horizontal", "below" and "transverse", as well as any other similar directional term, refers to the embodiment described in the operating position. Finally, terms of degree such as "substantially", "about" and "approximately" as used herein are intended as a reasonable amount of deviation of the modified term such that the final result is not significantly changed.

While only selected embodiments have been chosen to illustrate the present invention, it will be apparent from this description to those skilled in the art that various modifications and variations can be made without departing from the scope of the invention as defined in the appended claims. For example, the sizes, shape, position or orientation of the various components can be modified as needed and/or desired. The components shown which are directly connected or in contact with each other can have intermediate structures arranged between them. The functions of one element can be performed by two and vice versa. The structures and functions of one embodiment can be adopted in another embodiment. All the advantages of a particular embodiment do not necessarily have to be present at the same time. Any characteristic that is original compared to the prior art, alone or in combination with other characteristics, should also be considered a separate description of further inventions by the applicant, including the structural and/or functional concepts embodied by such characteristics. Therefore, the foregoing descriptions of the embodiments according to the present invention are provided for illustrative purposes only and not for the purpose of limiting the invention as defined by the appended claims and their equivalents.

The invention claimed is:

1. A bicycle comprising a frame, a rear wheel, a suspension system of the rear wheel with respect to the frame that allows a predetermined relative displacement between them, a drivetrain system for transmitting the motion from a crankset to the rear wheel, where the drivetrain system comprises a crankset fixed to the frame, a hub and pinion assembly fixed to the rear wheel that is rotatable about a common pivot axis thereof, and a drive chain placed to connect the crankshaft and the hub and pinion assembly directly to each other, where the crankset and the hub and pinion assembly are subjected to reciprocal displacement by the action of the suspension system, where at least one among the crankset and the hub and pinion assembly comprises a free stroke device placed to allow both a forward and backward free angular stroke of the chain with respect to the respective pivot axes of the crankset and/or of the hub and pinion assembly, where the angular stroke is limited by a predetermined angle of entity related to said relative movement between wheel and frame, wherein the forward stroke is the one that occurs both in the passage from an extended position to a compressed position of the suspension, and at the start of the pedalling in extended position of the suspension, said free stroke device comprises first damper means that act for the entire forward angular stroke, opposing the forward angular stroke, and said free stroke device comprises additional damper means that act only in a final stretch of the forward angular stroke, opposing final stretch of the forward angular stroke.

2. A bicycle according to claim 1, wherein the free stroke device comprises further additional damper means that act only in a final stretch of the rearward angular stroke, opposing final stretch of the rearward angular stroke.

3. A bicycle according to claim 2, wherein the additional damper means that act only on a final stretch of the forward angular stroke provide a resistance to the increased rotation of the additional damper means that act only in a final stretch of backward angular stroke.

4. A bicycle according to claim 1, wherein the additional damper means that act only on a final stretch of the forward angular stroke provide a resistance to the increased rotation of the first damper means.

5. A bicycle according to claim 1, wherein the crankset comprises at least one pair of cranks, a drive shaft placed to connect the cranks to each other and extending about a common pivot axis thereof, at least one gear wheel placed to rotate about said axis and intended to engage the chain; where said free stroke device is operatively interposed between the gear wheel and the cranks to allow said free stroke with respect to the cranks.

6. A bicycle according to claim 5, wherein said elastic element is interposed between two abutment elements which move close to and away from each other due to the effect of such stroke, where the elastic element is compressed between the two abutment elements at stroke end.

7. A bicycle according to claim 5, wherein the at least one elastic element comprises at least one element made of elastomeric material compressed in said final stretch of stroke, and the first damper means comprise at least one helical spring compressed along said entire angular stroke.

8. A bicycle according to claim 7, wherein the at least one elastic element comprises at least one element made of elastomeric material compressed in said final stretch of stroke, wherein the elastomeric element is interposed between two elements that are rotatable with respect to each other, one of the two elements comprises a seat for said elastomeric element, the elastomeric element being integral in rotation with said seat, and the seat keeps the elastomeric element in a contactless position with the other rotatable element before the stretch in which it is compressed.

9. A bicycle according to claim 1, wherein said hub and pinion assembly comprises at least one free body and at least one gear wheel, where the free stroke device is placed to allow said free stroke therebetween.

10. A bicycle according to claim 1, wherein the additional damper means comprise at least one elastic element placed at stroke end.

11. A bicycle according to claim 1, wherein the additional damper means comprise hydraulic damper means comprising at least one pair of hydraulic chambers that communicate by means of a communication opening placed at a stroke end abutment, at least one of the two chambers has arc extension with angular extension corresponding at least to said free stroke, and at least one movable abutment element in said chamber to retract against the stroke end abutment, the chamber contains hydraulic fluid and reducer means of the communication opening as the movable element nears the stroke end abutment.

12. A bicycle according to claim 11, wherein said reducer means move in rotation integrally with said movable abutment element.

13. A bicycle according to claim 11, wherein said hydraulic chambers comprise a radially outer wall and a radially inner wall that are movable in rotation with respect to each other, where the passage between the chambers comprises a close zone between said two walls and where the reducer means comprise a ramp in at least one of said two walls that can be inserted and extracted into/from said close zone.

14. A bicycle according to claim 13, wherein said movable abutment element is integral with one of the two walls and the other defines the stroke end abutment.

15. A drivetrain system of the type indicated in claim 1.

16. A crankset of the type indicated in claim 1.

17. A pinion assembly comprising a plurality of pinions and a free stroke device coupled thereto and of the type indicated in claim 1, where the unit comprises a coupling and uncoupling or integration interface with a hub assembly of a bicycle.

18. A free stroke device of the type indicated in claim 1.

19. A free stroke device according to claim 1, comprising a first and a second main body, where the first and second body:
   are rotatably coupled to each other;
   each comprise at least one pair of abutments operatively facing the pair of abutments of the other body, one of the two bodies having an angular distance between the abutment pair that is greater than the other body so that the interaction of said pairs defines two stroke ends of said forward and backward free angular stroke,
   the additional damper means are operatively active with respect to said abutment pairs to dampen the abutment of at least one of the two stroke ends.

20. A device according to claim 19, wherein said additional damper means comprise at least one viscous dissipator.

* * * * *